United States Patent [19]

Satou

[11] Patent Number: 4,845,480
[45] Date of Patent: Jul. 4, 1989

[54] IMAGE DISPLAY APPARATUS HAVING A PLURALITY OF DISPLAYS

[75] Inventor: Hitoshi Satou, Utsunomiya, Japan

[73] Assignee: Kabushiki Kaish Toshiba, Kawasaki, Japan

[21] Appl. No.: 145,714

[22] Filed: Jan. 15, 1988

Related U.S. Application Data

[63] Continuation of Ser. No. 743,684, Jun. 11, 1985, abandoned.

[30] Foreign Application Priority Data

Jun. 12, 1984 [JP] Japan ................................ 59-119005

[51] Int. Cl.[4] ............................................. G09G 1/16
[52] U.S. Cl. .................................. 340/717; 340/799; 340/744
[58] Field of Search ............... 340/717, 720, 744, 750, 340/799; 358/152

[56] References Cited

U.S. PATENT DOCUMENTS

| | | | |
|---|---|---|---|
| 3,961,324 | 6/1976 | Cousin et al. | 340/717 |
| 4,069,511 | 1/1978 | Lelke | 340/720 |
| 4,205,389 | 5/1980 | Heartz | 340/744 |
| 4,356,482 | 10/1982 | Oguchi | 340/744 |
| 4,364,090 | 12/1982 | Wendland | 358/140 |
| 4,573,080 | 2/1986 | Maze | 358/152 |
| 4,769,640 | 9/1988 | Sato | 340/799 |

Primary Examiner—Donald J. Yusko
Assistant Examiner—Jeffery A. Brier
Attorney, Agent, or Firm—Finnegan, Henderson, Farabow, Garrett, & Dunner

[57] ABSTRACT

In an image display apparatus, a frame memory for storing original data and a plurality of display memories for storing data to be displayed are used as memories for storing image data. Data transfer from the frame memory to the display memories is performed in accordance with a DMA scheme. The display memories as destinations of the data transfer are selectively switched. Since the image data transfer from the display memories is performed through a programmable data conversion memory, data conversion as image processing can be performed. The image data is read out from each of the display memories and is displayed on each of a plurality of display systems. An address signal for reading out at least a desired part of the image data from the frame memory is generated in synchronism with a common sync signal used when the image data is read out from the display memories.

19 Claims, 8 Drawing Sheets

IMAGE DISPLAY APPARATUS HAVING A PLURALITY OF DISPLAYS

This application is a continuation of application Ser. No. 06/743,684, filed June 11, 1985, now abandoned.

BACKGROUND OF THE INVENTION

The present invention relates to an image display apparatus used in a tomographic apparatus such as an X-ray CT (computed tomographic) apparatus or a magnetic resonance imaging system (MRI system).

In an imaging system of, e.g., an X-ray CT apparatus or an MRI system, an image display apparatus is used for displaying an image. For example, in an imaging system used in medical diagnosis, in place of a single still image, a series of image information of an identical part of an identical patient formed at different timings may have to be simultaneously displayed, or a plurality of image information of different patients, parts or processing methods may have to be simultaneously displayed. However, the conventional image display apparatus has only one display system and cannot effectively satisfy the above requirement.

When image data to be displayed has a matrix size larger than that of a display system, in the conventional image display apparatus, original image information is reduced so as to correspond to the matrix size of the display system, or a portion of the original image information is displayed and a displayed area thereof is appropriately switched so as to sequentially display the overall original image information. However, in the former case, i.e., in the case of reduction display, the reduced image cannot be subjected to detailed diagnosis. In the latter case, i.e., in the case of switching display of partial images, total observation cannot be made.

In the image display apparatus of this type, cine display (motion display) for displaying motion of a stomach or a heart as motion pictures is performed. The cine display of an image in, for example, a $512^2$ ($512 \times 512$) matrix corresponds to sequential display of 20 to 30 still images per second. For the cine display in a conventional image display system, if a series of images (still images sequentially displayed to display each image for a predetermined period of time) to be recognized as substantially a one-frame still image is given to an image unit, image information corresponding to 20 to 30 still images of the $512^2$ matrix per image is stored in a memory, and the 20 to 30 still images stored in the memory are switched at high speed and displayed. Therefore, in order to perform cine display, a very large capacity memory must be used, and images stored in the memory must be switched at high speed and displayed. For this reason, it is very difficult to realize an image display apparatus.

Furthermore, when window processing is performed for the image information (gradation is provided in a specific gray level range of the original image data), a still larger capacity memory is required, and memory access becomes more complicated. Image write/read access with respect to the memory and window processing are performed by a common central processing unit (CPU). Therefore, an image display switching speed is considerably decreased. For this reason, it is additionally difficult to realize the image display apparatus.

SUMMARY OF THE INVENTION

It is an object of the present invention to provide an image display apparatus which can simultaneously display a plurality of image data in a plurality of display systems or divide image data having a matrix size larger than that of one display system into a plurality of portions so as to correspond to a matrix size of the display system and simultaneously display all the divided portions on a plurality of display systems, and which can switch a plurality of images at high speed with a simple structure.

According to the image display apparatus of the present invention, a frame memory for storing original data prior to image data processing and a plurality of display memories for storing display image data are used as memories for storing image data. Image data transfer from the frame memory to the display memories is performed in accordance with a DMA (direct memory access) scheme. In the image display apparatus of this invention, the display memories as destinations of data transfer in accordance with the DMA scheme are selectively switched. In addition, the data transfer is performed through a programmable data conversion memory, thus performing data conversion as image processing. Image data are read out from the plurality of display memories and are displayed on corresponding display systems. Furthermore, in the data transfer in accordance with the DMA scheme, an address signal is generated for reading out at least a desired part of the image data from the frame memory in synchronism with a common sync signal used when image data are read out from the display memories and are displayed on the display systems. Therefore, according to this image display apparatus, the DMA transfer of the image data from the frame memory to the display memories is performed such that at least the desired part of the data from the frame memory is transferred in synchronism with read scanning of the image data from the display memories.

Therefore, according to the image display apparatus of the present invention, at least a part, i.e., a desired part of an image can be partially transferred while being subjected to image processing, e.g., window processing in synchronism with a common sync signal of the display systems in such a manner that readout display of an updating area on each display system by transfer from the frame memory corresponds to the transfer. Since a transfer destination is selected from the display memories respectively corresponding to the display systems, a plurality of images stored in the frame memory can be simultaneously displayed by the plurality of display systems. Furthermore, if a combination of a portion read from the frame memory and the display system as the destination is appropriately selected, an image having a matrix size larger than one display system stored in the frame memory is divided and can be simultaneously displayed on the plurality of display systems. Therefore, irrespective of a relatively simple structure, a plurality of image data can be simultaneously displayed on the plurality of display systems, or image data having a matrix size larger than that of one display system can be divided into a plurality of portions and can be simultaneously displayed on the display sections, and a plurality of images can be displayed and switched at high speed.

DETAILED DESCRIPTION OF THE PREFERRED EMBODIMENTS

Figure 1:
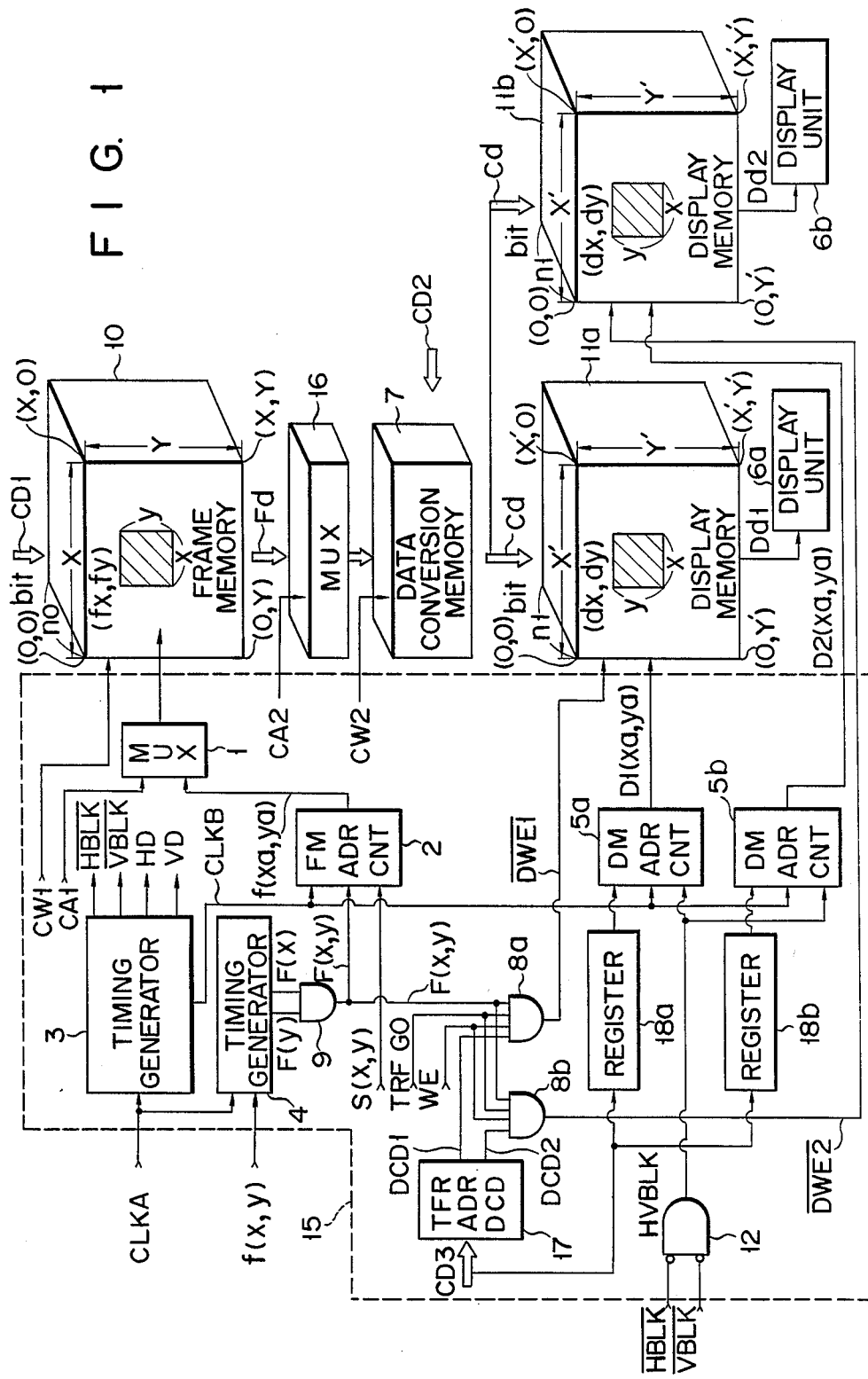
FIG. 1 is a block diagram schematically showing an arrangement of an image display apparatus according to a first embodiment of the present invention.

FIG. 1 shows an image display apparatus according to a first embodiment of the present invention.

Referring to FIG. 1, original image data is stored in a frame memory 10. The original image data is transferred as image data CD1 from, e.g., an external storage device under the control of a CPU (central processing unit: not shown), and the data CD1 is written in the frame memory 10 as first image data in response to a write signal CW1 supplied from the CPU. Output data Fd (the first image data) from the frame memory 10 is supplied to a data conversion memory 7 through a multiplexer (MUX) 16. In this case, the memory 7 has a capacity of 2×n1 bits. The memory 7 stores a table for converting the n0-bit data Fd (the first image data) read out from the memory 10 into n1-bit data Cd providing second image data. The memory 7 can store second image data corresponding to the first image data and can be write-accessed by the CPU. Therefore, since various types of conversion tables are selectively written in the memory 7 under the control of the CPU, the various types of tables can be used to convert the output data Fd (the first image data) into n1-bit data Cd. The output Cd (the second image data) from the memory 7 is supplied to, e.g., two display memories 11a and 11b. Respective outputs Dd1 and Dd2 from the memories 11a and 11b are supplied to display units 6a and 6b and are displayed. Each of the display units 6a and 6b has a D/A (digital-analog) converter and a CRT (cathode-ray tube) display device, and displays an image corresponding to at least a part of a storage content of the display memory 11a or 11b.

An arrangement of a memory controller 15 for controlling the frame memory 10 and the display memories 11a and 11b will be described below.

A timing generator 3 is responsive to a reference clock CLKA supplied from a clock generator (not shown) for generating a horizontal sync signal HD, a vertical sync signal VD, a horizontal blanking signal $\overline{\text{HBLK}}$, a vertical blanking signal $\overline{\text{VBLK}}$ and a signal CLKB which are used for image display at the display units 6a and 6b. The signals HD, VD, $\overline{\text{HBLK}}$ and $\overline{\text{VBLK}}$ are commonly used for the display units 6a and 6b. The signal CLKB is supplied as a count pulse to an FM (frame memory) address counter (FM ADR CNT) 2 connected to the timing generator 3 and DM (display memory) address counters (DM ADR CNTs) 5a and 5b which respectively correspond to the display memories 11a and 11b.

A timing generator 4 receives the reference clock CLKA and also receives data f(x,y) corresponding to a position and size of an image transfer area (transfer image write area) in the display memories 11a and 11b through the CPU upon being operated by an operator. The data f(x,y) is influenced by a provision of registers 18a and 18b (to be described later), and sets a predetermined size in the frame memory 10, i.e., a partial transfer size (to be described later). The timing generator 4 generates signals F(x) and F(y) which are respectively synchronized with the signals HD and VD and correspond to display scanning periods of an x-coordinate range and a y-coordinate range of a transfer update area on a display device of each of the display units 6a and 6b. The outputs F(x) and F(y) from the generator 4 are supplied to the counter 2 through a 2-input AND gate 9 as a timing signal F(x,y) corresponding to an address of the partial transfer area. The timing signal F(x,y) is also supplied to two 4-input AND gates 8a and 8b.

The counter 2 comprises a programmable sync counter (e.g., an SN 74163 available from Texas Instruments Inc.). The counter2 generates a signal f(xa,ya) in response to the signal CLKB supplied from the timing generator 3, the timing signal F(x,y) supplied from the AND gate 9, and an externally supplied transfer start address signal S(x,y) of the frame memory 10. The signal f(xa,ya) is supplied to one input terminal of a multiplexer (MUX) 1 connected to the counter 2. The multiplexer 1 receives the output signal f(xa,ya) from the counter 2 and an address signal CA1 on a CPU address bus, and selects one of these so as to supply an address input to the frame memory 10.

A transfer address decoder (TFT ADR DCD) 17 switches its output signals DCD1 and DCD2 to "H" (high level) or "L" (low level) in accordance with a signal CD3 supplied from the CPU. When the signals DCD1 and DCD2 are respectively at "H", they enable the AND gates 8a and 8b. The AND gate 8a receives the partial transfer address signal F(x,y) generated from the AND gate 9, an externally supplied partial transfer start signal TRFGO, an externally supplied write signal WE and the output signal DCD1 from the decoder 17. When logic conditions of these signals are established, a write signal $\overline{\text{DWE1}}$ is supplied from the AND gate 8a to the display memory 11a. Similarly, the AND gate 8b receives the timing signal F(x,y) generated from the AND gate 9, the externally supplied partial transfer start signal TRFGO, the externally supplied write signal WE, and the output signal DCD2 from the decoder 17. When logic conditions are established, a write signal $\overline{\text{DWE2}}$ is supplied from the AND gate 8b to the display memory 11b. A write operation of the display memories 11a and 11b is controlled by the signals $\overline{\text{DWE1}}$ and $\overline{\text{DWE2}}$.

An AND gate 12 having two negative inputs and a positive output receives the signals $\overline{\text{HBLK}}$ and $\overline{\text{VBLK}}$ supplied from the generator 3. The output from the AND gate 12 is supplied to the counters 5a and 5b as a count enable signal HVBLK. The counters 5a and 5b comprise the same programmable sync counters as that of the counter 2. The counters 5a and 5b receive the signal HVBLK generated from the AND gate 12 and the signal CLKB generated from the generator 3. The counters 5a and 5b also receive data held in the registers 18a and 18b, respectively. The registers 18a and 18b hold addresses on the display memories 11a and 11b corresponding to a start address (upper left address of a display screen). The address data held in the registers 18a and 18b can be set by a signal CD3 through the CPU, e.g., in accordance with an input operation of the operator. The counters 5a and 5b respectively generate address signals D1(xa,ya) and D2(xa,ya) supplied to the display memories 11a and 11b.

Operation of the image display apparatus with the above arrangement will now be described. First, image data write control for the frame memory 10 will be explained.

When the image data is written in the frame memory 10, the multiplexer 1 selects, for example, the address signal CA1 transferred from the CPU address bus. The address signal CA1 is supplied to the frame memory 10 through the multiplexer 1. That is, the image data CD1 transferred from the CPU is written in the frame memory 10 in accordance with the address signal CA1 and the write signal CW1 supplied from the CPU together with the data.

Note that the signal f(x,y) is supplied to the timing generator 4 through the CPU and comprises address data indicating a position and size of an (partial transfer) updating area on the display screen of the display units 6a and/or 6b. The address data f(x,y) determines the size of the transfer area on the frame memory 10. The address data f(x,y) is preset by pre-editing such that an operator moves, e.g., a tracking ball, a joy stick, a mouse or the like to shift a marker on the display screen so as to specify coordinates of a desired point.

The address signal for the frame memory 10 will now be described. The address signal with respect to the frame memory 10 is selected by the mutiplexer 1. When the signal f(xa,ya) from the counter 2 is selected, it serves as the address signal. In other words, an AND product F(x,y) of the outputs F(x) and F(y) from the generator 4 is used as a load instruction and count enable signal of the counter 2. The start address signal S(x,y) supplied from the CPU is used as a load input signal (i.e., a preset value signal) of the counter 2. The signal CLKB generated from the timing generator 3 is used as a count pulse. The content of the frame memory 10 is read out in accordance with the address signal comprising the data f(x,y) generated from the counter 2. The load input signal S(x,y) is synchronized with the signal VD from the display units 6a and 6b, and is loaded in the counter 2 during a blanking period between each two adjacent display frames. In this manner, the n0-bit data Fd read out from the frame memory 10 is selected by the multiplexer 1 and is converted by the memory 7 into the n1-bit data Cd. The image data Cd is supplied to the display memories 11a and 11b.

As previously described, the memory 7 stores various types of conversion tables supplied from the CPU. These tables are written in the memory 7 in response to the address data CA2 generated from the CPU and selected by the multiplexer 16. In this case, table data CD2 transferred from the CPU is written in the memory 7 in accordance with the address data CA2 supplied from the CPU through the multiplexer 16 and the write signal CW2 supplied from the CPU, thus forming the conversion table.

Data is written in the display memory 11a when the output $\overline{DWE1}$ from the AND gate 8a is enabled. Also, data is written in the display memory 11b when the output $\overline{DWE2}$ from the AND gate 8b is enabled. Write addresses of the display memories 11a and 11b are respectively designated by the counters 5a and 5b. The counters 5a and 5b are responsive to the count enable signal HVBLK generated from the AND gate 12. When the counters 5a and 5b are switched to a disable mode, read start addresses prestored in the registers 18a and 18b are loaded, and initial values of the counters 5a and 5b are preset as the start addresses. The counters 5a and 5b count the signal CLKB generated from the generator 3 in a count enable mode. The count outputs D1(xa,ya) and D2(xa,ya) of the counters 5a and 5b are supplied to the display memories 11a and 11b as the read addresses for display (when the outputs from the AND gates 8a and 8b are enabled, i.e., at "H" (high level), these outputs serve as write addresses). If the preset value of the register 18a is (0,0) and the matrix size (X'×Y') of the display memories 11a and 11b coincides with the display matrix size of the display, the output D1(xa,ya) of the counter 5a starts at (0,0) and is sequentially changed in an order of (1,0), (2,0), . . . , (X',0), (0,1), (1,1), (2,1), (3,1), . . . , (0,Y'), (1,Y'), (2,Y'), . . . , (X',Y'), (0,0), (1,0). . . . The output D1(xa,ya) is synchronized with the horizontal and common vertical sync signals HD and VD of the display units 6a and 6b. The output D2(xa,ya) from the counter 5b is the same as the output D1(xa,ya) from the counter 5a except that it starts at the value preset by the register 18b.

The data in the display memories 11a and 11b are displayed by means of the display units 6a and 6b. That is, the display units 6a and 6b D/A convert the data read out from the display memories 11a and 11b and display it on their display devices. In this case, the read addresses from the display memories 11a and 11b are designated by the counters 5a and 5b, as described above.

In this manner, when the operations of the display memories 11a and 11b are controlled by the memory controller 15, image data of a specified portion of the frame memory 10 is transferred to the desired display memory 11a or 11b and is displayed by the display unit 6a or 6b.

Partial transfer control for the image display apparatus will be described in more detail.

For example, when only a portion of the image data (indicated by the hatched portion in FIG. 1) in the display screen of the display memory 11a (a description will be made only for the memory 11a for the sake of simplicity) is updated, that is, when the image data in a portion of the frame memory 10 (indicated by the hatched region in FIG. 1) corresponding to the above portion of the display memory 11a is transferred to the memory 11a, data for designating the start address (fx,fy) of the corresponding portion is supplied to the counter 2 as data S(x,y), and a partial transfer matrix size x,y is supplied to the generator 4 as data f(x,y). The data f(x,y) includes data corresponding to a position of the partial transfer area on the display screen of the display. Since the start address S(x,y) of the transfer area (read area) of the frame memory 10 is loaded as fx and fy during a blanking period between each two adjacent display frames of the display units 6a and 6b the counter 2 as a programmable sync counter is preset at these values.

The generator 4 receiving the data f(x,y) generates timing signals F(x) and F(y) in synchronism with the signals HD and VD (see FIG. 3), respectively. When the signal CLKB is supplied to the counter 5a, the count thereof used as the read address of the memory 11a is incremented. When the count of the counter 5a reaches the start address (dx,dy) of the transfer area, the counter 2 is enabled in response to the signal F(x,y) produced with reference to the data f(x,y) for setting the position and size of the transfer area. The signal f(xa,ya) is synchronized with incrementing of the address of the memory 11a and therefore, the counter 2 is set in the address increment mode. In this case, since the AND condition of the AND gate 8a is established (i.e., the externally supplied signal TRFGO for the partial transfer mode goes to "H"), the signal $\overline{DWE1}$ is enabled. Thus, the display memory 11a is set in the write mode, and the image data read out from the frame memory 10 is written in the display memory 11a.

The operation timings for the partial transfer will be described with reference to FIGS. 2 to 5.

Figure 2:
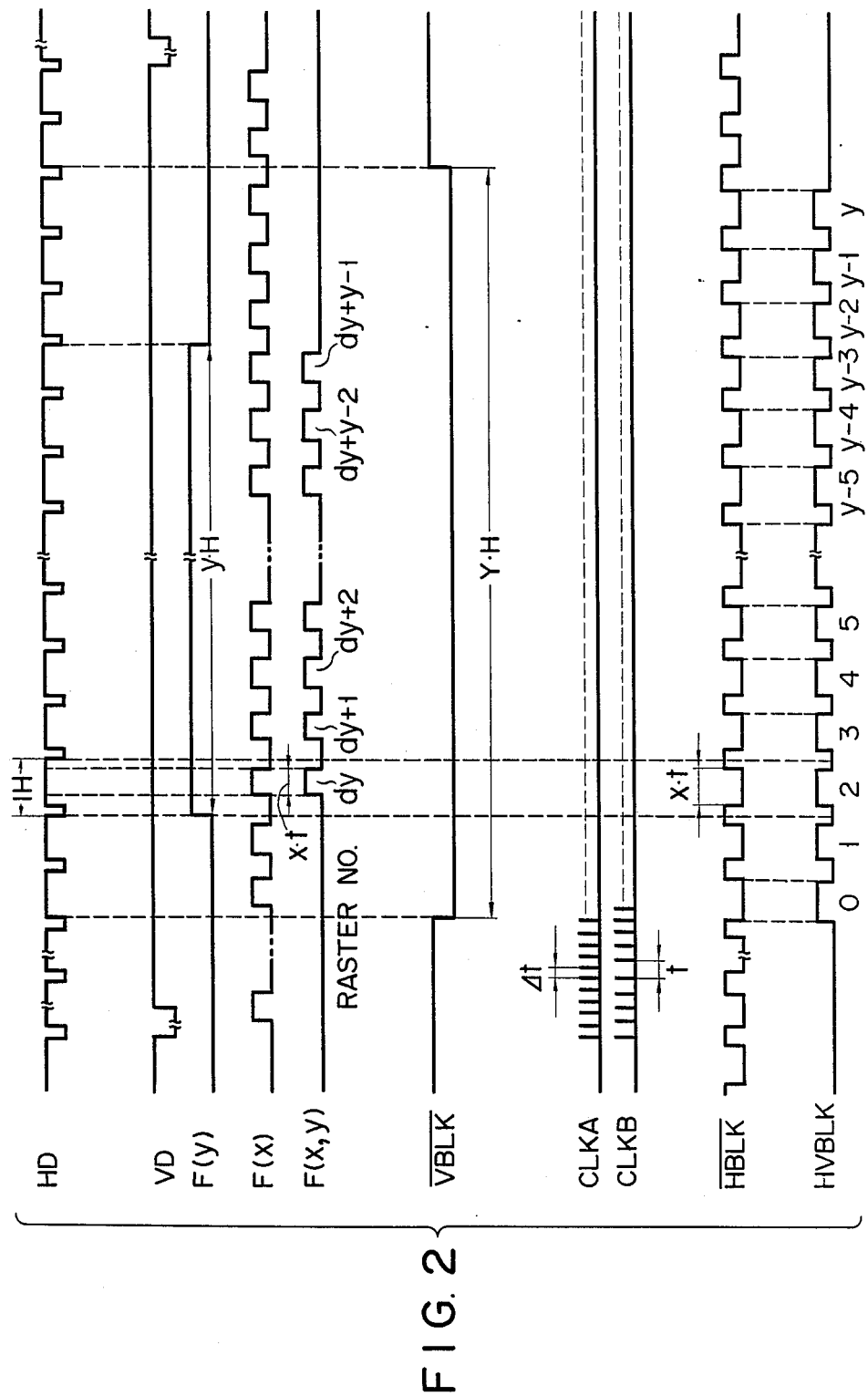
FIG. 2 is a waveform chart helpful in explaining certain aspects of the operation of the first embodiment shown in FIG. 1 as discussed in detail below.

Referring to FIG. 2, the signals F(x) and F(y) respectively comprise an X address signal and a Y address signal of the transfer area generated from the generator 4 in synchronism with the signals HD and VD. The signal F(x,y), which is an AND output of the signals F(x) and F(y), is generated from the AND gate 9. The y·H period of the signal F(y) becomes a partial transfer time (corresponding to a partial transfer address region) in a vertical direction. The output HVBLK of the AND gate 12 is the logical product of the signals $\overline{VBLK}$ and $\overline{HBLK}$ generated by the generator 3.

Figure 3:
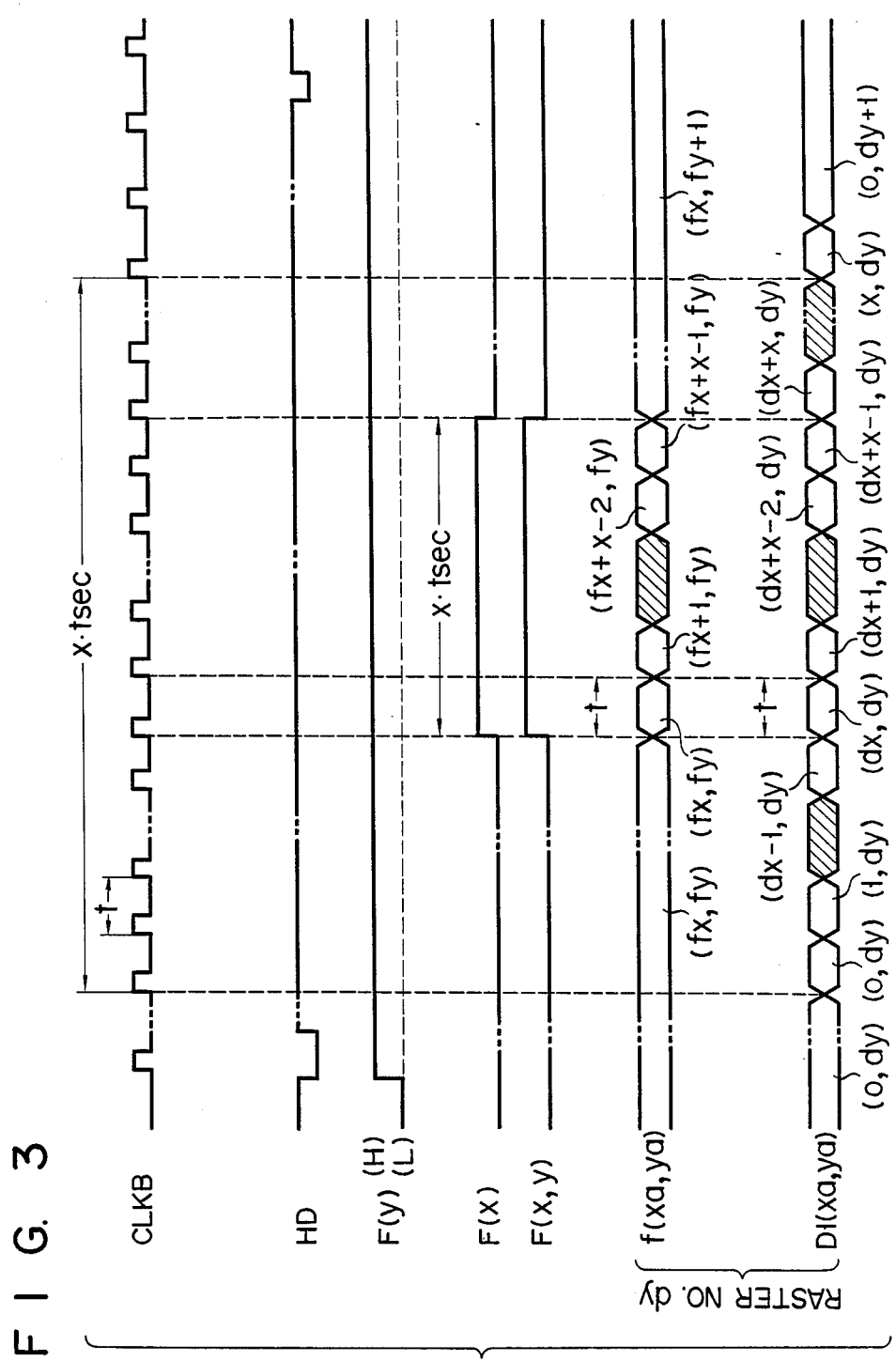
FIG. 3 is a waveform chart showing in detail certain aspects of the operation of the first embodiment shown in FIG. 1 as discussed in detail below.
Figure 4:
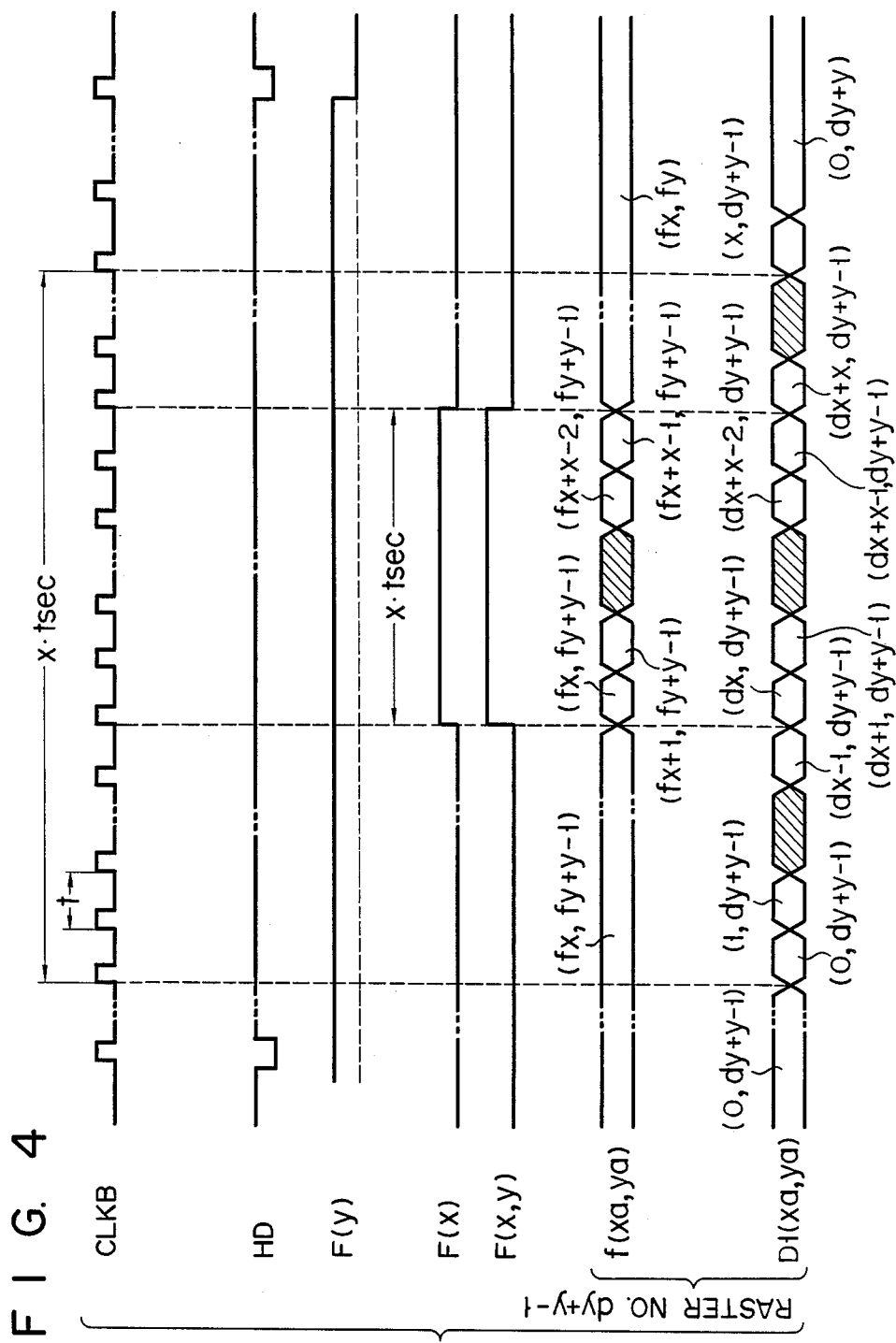
FIG. 4 is a waveform chart showing in detail certain aspects of the operation of the first embodiment shown in FIG. 1 as discussed in detail below.

When the partial transfer area matrix is given by x×y, an address time corresponding to the horizontal address range of the transfer area is given to be Xt sec, as shown in FIGS. 3 and 4. A partial transfer address f(xa,ya) of the frame memory 10 during Xt sec period is produced by the counter 2 and is incremented in an order of (fx,fy), (fx+1,fy), . . . , (fx+x−2,fy), (fx+x−1,fy) up to (fx,fy+1). The partial transfer address f(xa,ya) is incremented by one address along the vertical direction, i.e., y direction every time a line number, i.e., a raster number dy, is increased. In this case, the address D1(xa,ya) of the memory 11a is updated in an order of (0,dy), (1,dy), . . . , (dx−1,dy), (dx,dy), (dx+1,dy), . . . , (dx+x−1,dy), (dx+x,dy) during the Xt sec period so as to correspond to the horizontal scanning of the display 6a. The address D1(xa,ya) is used for displaying the transfer area having the matrix size x×y.

Figure 5:
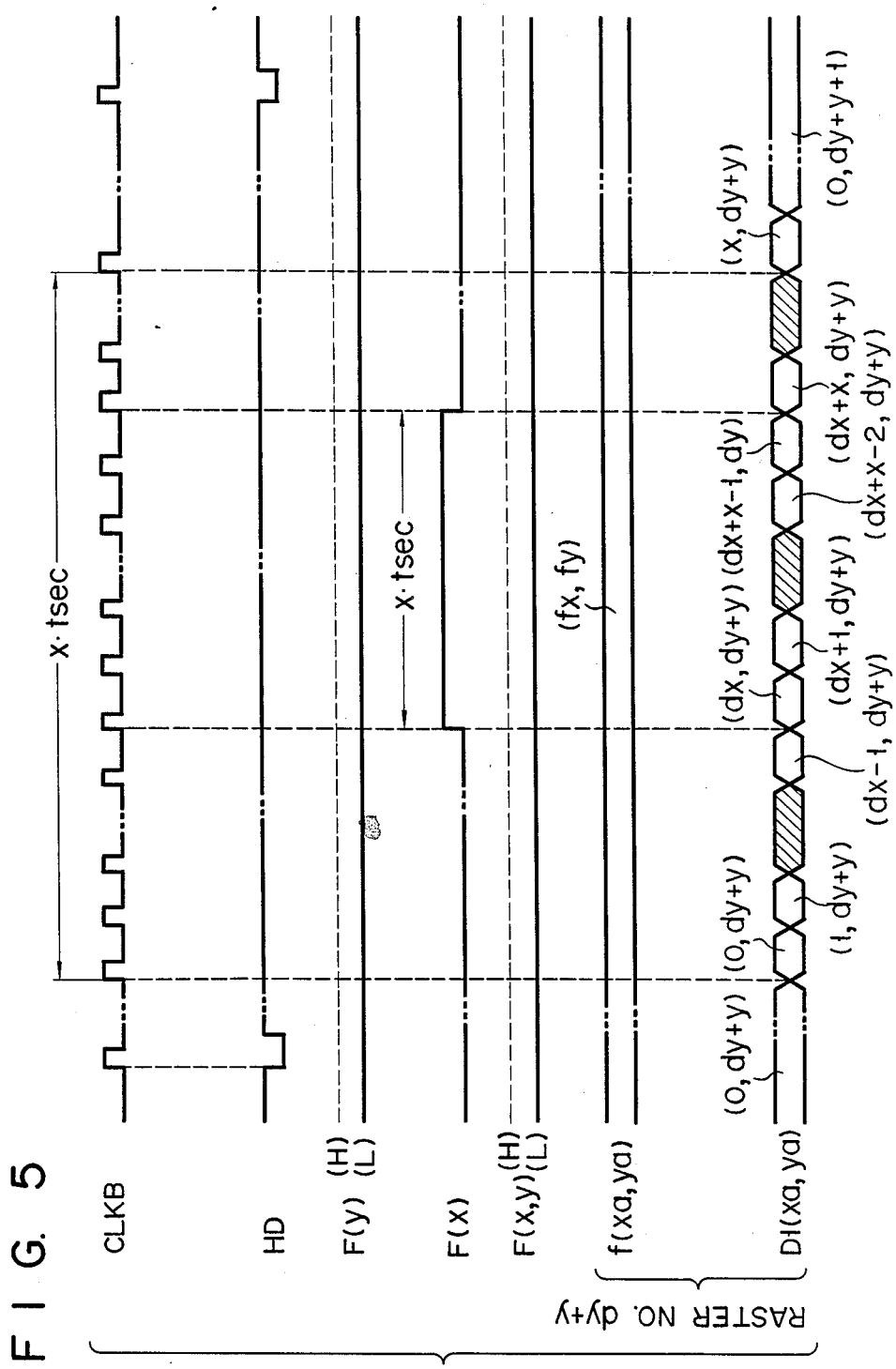
FIG. 5 is a waveform chart showing in detail certain aspects of the operation of the first embodiment shown in FIG. 1 as discussed in detail below.

It should be noted that FIG. 5 illustrates the timings of respective signals excluding the area of the vertical transfer address time y H shown in FIG. 2. In this case, since the signal F(y) goes to "L" (low level), the AND product F(x,y) of the signals F(x) and F(y) also goes to "L".

When the product F(x,y) of the signals F(x) and F(y) falls within the range of F(x,y)="H", i.e., in the partial transfer area, since the AND condition of the AND gate 9 is established, the signal $\overline{DWE1}$ is enabled. Thus, the image data at the address (fx,fy) in the frame memory 10 is written at the address (dx,dy) in the display memory 11a through the memory 7. In other words, the image data in the transfer area of the frame memory 10 is transferred to the display memory 11a while the signal $\overline{DWE1}$ is being enabled.

The description has been made with reference to the case wherein the image data in the frame memory 10 is transferred to the display memory 11a. When the output DCD2 of the decoder 17 goes to "H" and the AND gate 8b is enabled, the signal $\overline{DWE2}$ is enabled and therefore, the image data in the memory 10 is transferred to the display memory 11b.

The outputs Dd1 and Dd2 from the display memories 11a and 11b are supplied to the display units 6a and 6b, and are A/D converted, thus being displayed on the display.

Therefore, the image data stored in the frame memory 10 is arbitrarily transferred to the display memories 11a and 11b, and the image data thus stored in the memories 11a and 11b is simultaneously displayed by the display units 6a and 6b. In this case, since the read display address of the memories 11a and 11b can be controlled, even if the matrix size (X'×Y') of the memories 11a and 11b is larger than that of the display screens of the display units 6a and 6b, a write area of the data transferred from the memory 10 is changed by changing the read start address. Therefore, the storage content of the memory 10 can be transferred to the memories 11a and 11b, respectively.

When the matrix size of the image data stored in the memory 10, i.e., the image data to be displayed is larger than that of the display units 6a and 6b, the read start address S(x,y) from the memory 10 is switched for each of the memories 11a and 11b so as to be selectively transferred to the memories 11a and 11b. Thus, the image can be divisionally displayed on the display units 6a and 6b. In this manner, observation of an overall image having a large matrix size can be performed without degrading resolution.

In any case, if images of a plurality of frames to be displayed are sequentially changed, the above-mentioned data transfer is performed while switching the images at high speed, thus performing cine display. Note that even if cine display is performed, the display memories 11a and 11b do not require a large capacity for the following reason. That is, if only changing portions among the images of the plurality of frames subjected to cine display are transferred, the images can be switched at high speed. Thus, the memories 11a and 11b need store image data of only one frame or more, and all the image data corresponding to the images of the plurality of frames subjected to the cine display need not be stored in the display memories.

For example, when the frame memory 10 stores sequential motion images of a plurality of frames for the same portion of the same patient, the transfer area start address S(x,y) of the frame memory 10 is changed every time the data for one frame is transferred in synchronism with the common sync signal VD for the display units 6a and 6b, and the images of the plurality of frames in the memory 10 can be sequentially transferred. When the images of the plurality of frames are sequentially switched, if the outputs DCD1 and DCD2 from the decoder 17 are switched for each frame, the motion images (actually, every other frame) can be simultaneously displayed on the display units 6a and 6b. In this case, among the images displayed on the display units 6a and 6b, a stationary portion is first transferred to the display memories 11a and 11b and thereafter, a portion in motion can be partially transferred to the memories 11a and 11b (for example, a scano-image in an X-ray CT apparatus contains the image of a moving portion such as a heart and the image of the background portion such as a bone). In this manner, a decrease in transfer time and capacity of the frame memory and improvement in efficiency can be achieved, and the images can be switched at high speed. Of course, in any case, when data is transferred to one display memory (the other display memory is not updated), the transfer speed can be further increased. Furthermore, two images having different imaging times, portions, directions, magnifications and the like can be simultaneously displayed on the display units 6a and 6b, and comparison between such images can be made.

Figure 6:
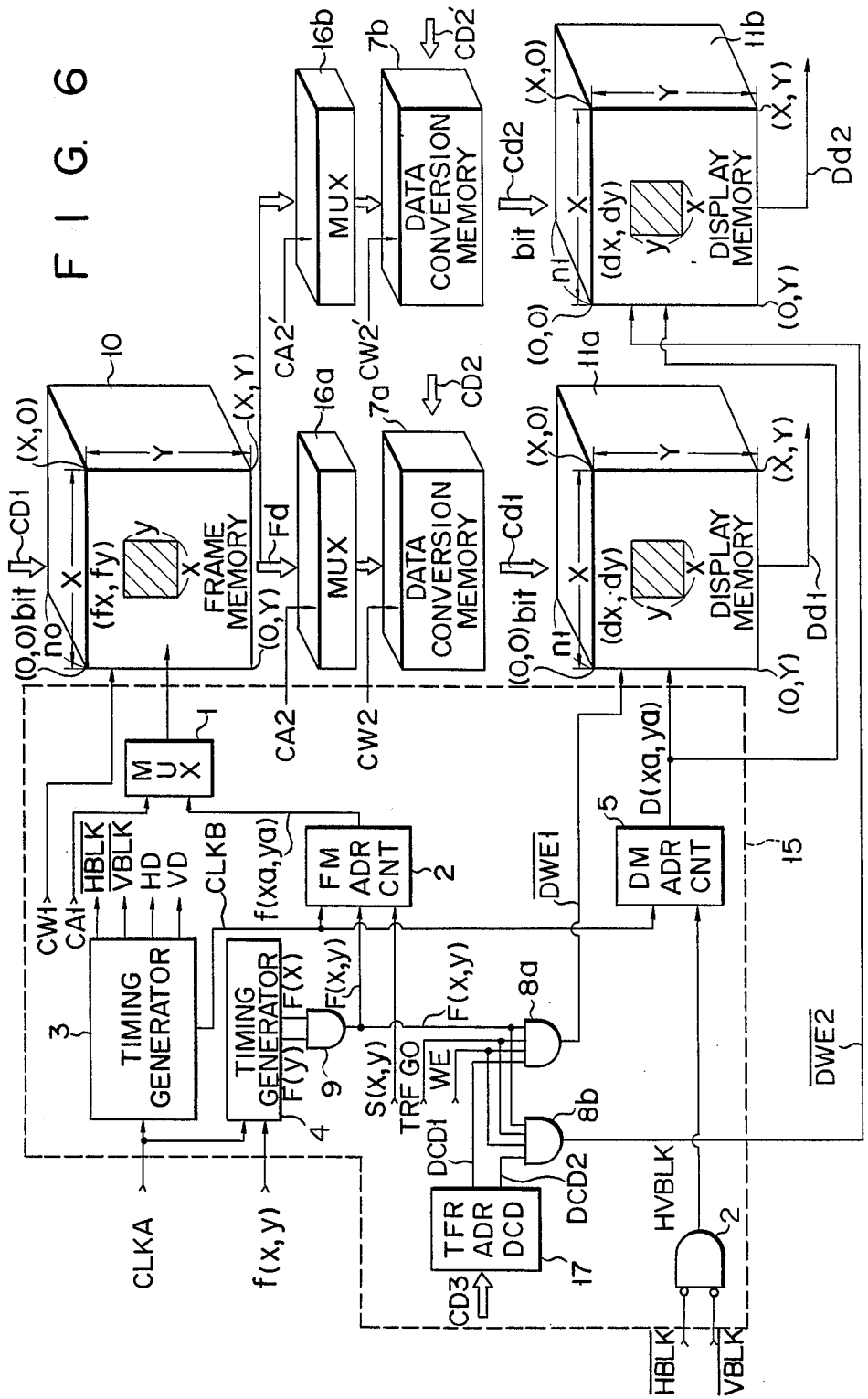
FIG. 6 is a block diagram showing a main part of an image display apparatus according to a second embodiment of the present invention.

FIG. 6 shows a second embodiment of an image display apparatus according to the present invention. The apparatus shown in FIG. 6 has substantially the same arrangement as that of the first embodiment shown in FIG. 1 with the following exceptions.

In this case, a multiplexer and a data conversion memory provided between the frame memory 10 and the display memories 11a and 11b are provided for each of the memories 11a and 11b. A multiplexer 16a and a data conversion memory 7a are provided for the memory 11a, and a multiplexer 16b and a data conversion memory 7b are provided to the memory 11b. The multiplexer 16a receives an output Fd from the memory 10 and address data CA2 from the CPU, and selects one of them. The output from the multiplexer 16a is converted by the memory 7a and is supplied to the display memory 11a as data Cd1. The memory 7a stores data CD2 from the CPU or is updated as needed in response to a write signal CW2 from the CPU. Similarly, the multiplexer 16b receives the output Fd from the memory 10 (commonly used as the output supplied to the multiplexer 16a) and address data CA2' from the CPU, and selects one of them. The output from the multiplexer 16b is converted by the memory 7b and is supplied to the memory 11b as data Cd2. The memory 7b stores data CD2' from the CPU or is updated as needed in response to a write signal CW2' from the CPU. Note that in this embodiment, the memories 11a and 11b have the same matrix size and address space as those of the frame memory 10, and the registers 18a and 18b for individually setting the read start addresses of the memories 11a and 11b are omitted. Thus, a common DM address counter 5 is used for designating the addresses of the memories 11a and 11b. The counter 5 is enabled by an output HVBLK from the NAND gate 12 during a period excluding the vertical and horizontal blanking periods, and counts the signal CLKB generated from the generator 3, thus incrementing a designation address.

In this embodiment, since contents of the memories 7a and 7b corresponding to the memories 11a and 11b can be individually set through the CPU, when the image data is transferred to the memories 11a and 11b, different image processing operations (e.g., window processing operations having different setting conditions) can be performed.

In the above embodiment (corresponding to the timing charts in FIGS. 2 to 5), image data transfer from the frame memory 10 to the display memory 11a (or 11b) is completed during one frame period (between two adjacent VD periods). However, even when every other scanning line is scanned in an interlaced scanning mode, a partial transfer can be performed.

Figure 7:
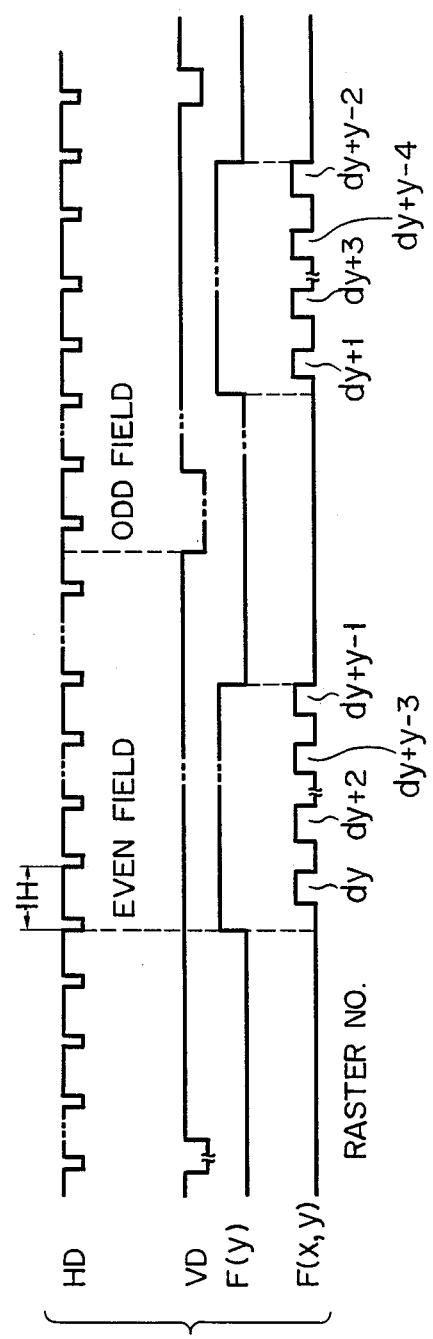
FIG. 7 is a waveform chart of respective portions for explaining an operation of a third embodiment of the present invention.

FIG. 7 shows the timing chart of a third embodiment of the present invention. In this embodiment, one frame image data can be transferred by a set of even- and odd-fields. Since interlaced scanning is performed, the vertical address increment operation of the FM address counter 2 and the DM address counters 5a and 5b (or 5) does not correspond to that of the first embodiment (i.e., the horizontal address increment operation corresponds to that of the first embodiment).

Referring to the timing chart of FIG. 7, odd- and even-field image data can be alternately transferred in units of pixels. In the even-field period, only the even-field address data is transferred by the signal f(xa,ya), and in the odd-field period, only the odd-field address data is transferred by the signal f(xa,ya). This is a fourth embodiment of the present invention, and an arrangement of an apparatus according to this embodiment is shown in FIG. 8.

Figure 8:
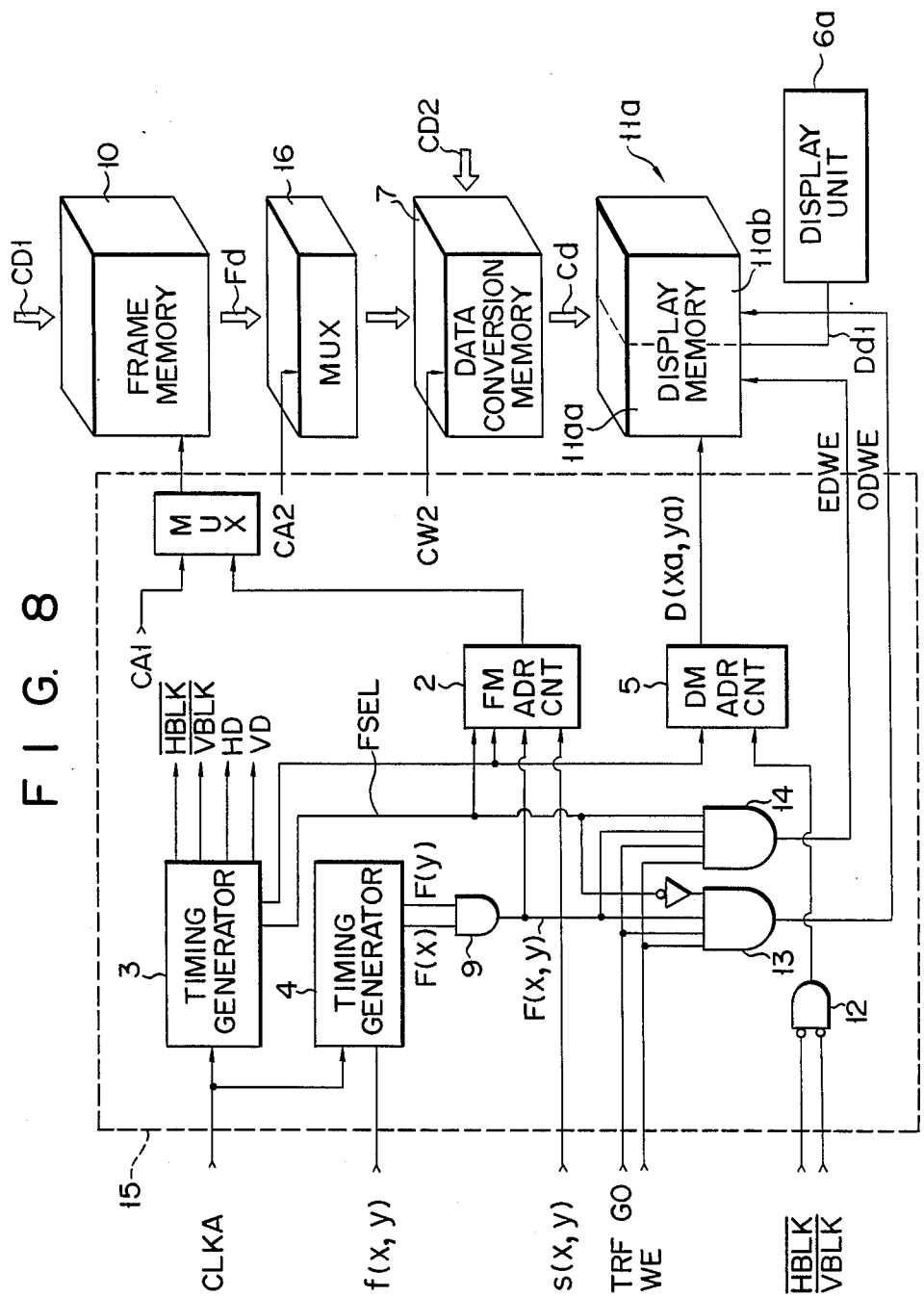
FIG. 8 is a block diagram showing a main part of an image display apparatus according to a fourth embodiment of the present invention.

As shown in FIG. 8, an AND product between the output FSEL of the timing generator 3 and signals WE, TRFGO and F(x,y) are respectively generated from AND gates 13 and 14. The odd-field is enabled by an output (ODWE) from the AND gate 13, and the even-field is enabled by an output (EDWE) from the AND gate 14. An even-field memory portion (EMEM) 11aa of the display memory 11a and an odd-field memory portion (OMEM) 11ab thereof are switched by the outputs from the AND gates 13 and 14. In this case, the counter 2 is also switched for the even and odd addresses in response to the signal FSEL. With this arrangement, partial transfer for the interlaced scanning can be performed. In this case, since the even- and odd-fields are alternately transferred to the display memories 11aa and 11ab in units of pixels, the access rates of the memories 11aa and 11ab are decreased, so that low-response speed memories can be used.

Needless to say, in the display memory 11b, partial transfer for the interlaced scanning can be performed in the same manner as in the memory 11a.

In the above embodiments, two display memories and two display units are provided. However, they can be two or more. In this case, in FIG. 1, the number of the AND gates (8a, 8b), DM address counters (5a, 5b) and registers (18a, 18b) can correspond to that of the display memories (11a, 11b) and display units (6a, 6b). Similarly, in FIG. 6, the number of the AND gates (8a, 8b), MUXs (16, 16') and data conversion memories (7, 7') can correspond to that of the display memories and display units.

What is claimed is:

1. An image display apparatus comprising:
 a frame memory for storing first image data;
 data converting means for converting the first image data to second image data which is processed data and for generating the second image data in response to the first image data read out from said frame memory;
 a plurality of display memories for storing the second image data transferred from said data converting means;
 a plurality of displaying means, one of said plurality of displaying means being provided for each of said display memories, for reading out the second image data stored in said display memories in synchronism with a common synchronizing signal so as to display the second image data; and
 memory controlling means for producing on said plurality of display means a cine display of said second image data, said memory controlling means comprising address generating means, responsive to said common synchronizing signal, for generating an address signal for reading out at least part of the first image data from said frame memory, for generating an address signal for writing the second image data from said data converting means into each of said display memories and for generating an address signal for reading out the second image data stored in said display memories, and control means including memory designating means for selectively designating at least one of said display memories, said control means controlling the reading of at least part of the first image data from said frame memory, the writing of the second image data from said data converting means into at least one of said display memories designated by said memory designating means and the reading of the second image data stored in at least one of said display memories.

2. An apparatus according to claim 1, wherein said data converting means has a data conversion table which is programmable.

3. An apparatus according to claim 1, wherein said data converting means comprises a plurality of data converting components and one of said plurality of data converting components is provided for each of said display memories.

4. An apparatus according to claim 1, wherein said data converting means comprises a memory for storing the second image data corresponding to the first image data.

5. An apparatus according to claim 1, further comprising means for externally setting an image area corresponding to the address signal generated from said address generating means.

6. An apparatus according to claim 1, wherein said displaying means display an image in accordance with non-interlaced scanning.

7. An apparatus according to claim 1, wherein said displaying means display an image in accordance with interlaced scanning.

8. An apparatus according to claim 1, wherein said displaying means display an image in accordance with interlaced scanning, and each of said display memories is divided into an even-field memory area and an odd-field memory area.

9. An apparatus according to claim 1, wherein said displaying means display an image in accordance with interlaced scanning, each of said display memories is divided into an even-field memory area and an odd-field memory area, and said address generating means generates even addresses during an even-field period and odd addresses during an odd-field period.

10. An image display apparatus comprising:
a frame memory for storing first image data;
data converting means for converting the first image data to second image data which is processed data and for generating the second image data in response to the first image data read out from said frame memory;
a plurality of display memories for storing the second data transferred from said data converting means;
a plurality of displaying means, one of said plurality of displaying means being provided for each of said display memories, for reading out the second image data stored in said display memories in synchronism with a common synchronizing signal so as to display the second image data; and
memory controlling means for producing on said plurality of displaying means a cine display of said second image data, said memory controlling means comprising
address generating means, responsive to said common synchronizing signal, for generating an address signal for reading out at least part of the first image data from said frame memory, for generating an address signal for writing the second image data from said data converting means into each of said display memories and for generating an address signal for reading out the second image data stored in said display memories, control means including memory designating means for selectively designating at least one of said display memories, said control means controlling the reading of at least part of the first image data from said frame memory, the writing of the second image data from said data converting means into at least one of said display memories designated by said memory designating means and the reading of the second image data stored in at least one of said display memories, and address defining means for individually defining a read address of the second image data for reading out from said display memories for each of said displaying means.

11. An apparatus according to claim 10, wherein at least one of said display memories and said frame memory includes a memory having an image matrix size larger than a display image matrix size of said displaying means.

12. An apparatus according to claim 10, wherein said data converting means has a data conversion table which is programmable.

13. An apparatus according to claim 10, wherein said data converting means comprises a plurality of data converting components and one of said data converting components is provided for each of said display memories.

14. An apparatus according to claim 10, wherein said data converting means comprises a memory for storing the second image data corresponding to the first image data.

15. An apparatus according to claim 10, further comprising means for externally setting an image area corresponding to the address signal generated from said address generating means.

16. An apparatus according to claim 10, wherein said displaying means display an image in accordance with non-interlaced scanning.

17. An apparatus according to claim 10, wherein said displaying means display an image in accordance with interlaced scanning.

18. An apparatus according to claim 10, wherein said displaying means display an image in accordance with interlaced scanning, and each of said display memories is divided into an even-field memory area and an odd-field memory area.

19. An apparatus according to claim 10, wherein said displaying means display an image in accordance with interlaced scanning, each of said display memories is divided into an even-field memory area and an odd-field memory area, and said address generating means generates even addresses during an even-field period and odd addresses during an odd-field period.

* * * * *